United States Patent [19]

Koumo et al.

[11] Patent Number: 5,065,359
[45] Date of Patent: Nov. 12, 1991

[54] DESK TOP CALCULATOR WITH ACCESS SEQUENCE CONTROL SYSTEM FOR VARIOUS CONSTANTS

[75] Inventors: Hideyasu Koumo, Yamatokoriyama; Fumiaki Kawawaki, Nara, both of Japan

[73] Assignee: Sharp Kabushiki Kaisha, Osaka, Japan

[21] Appl. No.: 436,905

[22] Filed: Nov. 15, 1989

[30] Foreign Application Priority Data

Nov. 18, 1988 [JP] Japan .................. 63-293019

[51] Int. Cl.⁵ .................. G06F 3/02; G06F 9/22; G06F 9/32; G06F 9/34
[52] U.S. Cl. .................. 395/800; 364/707.16; 364/710.03; 364/706; 364/958.1; 364/965.3; 364/965; 364/965.5; 364/933; 364/955; 364/962.1; 364/946.2; 364/960; 364/928; 364/234; 364/251; 364/260; 364/260.2; 364/DIG. 1; 364/DIG. 2
[58] Field of Search ............ 364/200 MS File, 709.16, 364/710.03, 900 MS File, 706

[56] References Cited

U.S. PATENT DOCUMENTS

| | | |
|---|---|---|
| 3,760,370 | 9/1973 | Cochran .................. 364/200 |
| 4,107,782 | 8/1978 | Cochran .................. 364/200 |
| 4,713,749 | 12/1987 | Magar et al. .................. 364/200 |
| 4,718,029 | 1/1988 | Morino et al. .................. 364/709.16 |
| 4,901,262 | 2/1990 | Tanaka et al. .................. 364/709.16 |
| 4,954,977 | 9/1990 | Colombat .................. 364/710.03 |

*Primary Examiner*—Thomas C. Lee
*Assistant Examiner*—Mehmet Geckil
*Attorney, Agent, or Firm*—Morrison & Foerster

[57] ABSTRACT

The desk-top calculator in accordance with the present invention comprises a constant access key, a ROM and a control unit. The ROM is arranged such that different types of constants are anteriorly stored therein and the constants are accessed through the operation of the constant access key. The control unit is arranged such that, as well as accessing successively the different types of constants stored in the ROM each time the constant access key is operated consecutively, after one of the contants is accessed through the operation of the constant access key, when another key is operated and the constant access key operated again thereafter, the control unit accesses the constant previously accessed in the first place.

According to the arrangement described above, the operation of such a desk-top calculator is simplified and its operation efficiency is sharply improved.

15 Claims, 4 Drawing Sheets

DESK TOP CALCULATOR WITH ACCESS SEQUENCE CONTROL SYSTEM FOR VARIOUS CONSTANTS

FIELD OF THE INVENTION

The present invention relates to a desk-top calculator, such as a scientific electronic calculator, having a function for accessing constants stored anteriorly for calculation uses.

BACKGROUND OF THE INVENTION

Some of the conventional desk-top calculators, like for example a scientific electronic calculator for scientific calculations, are arranged such that constants stored anteriorly, universal gravitation constant, gas constant and the like, may be accessed for calculation uses whenever occasion calls.

Such a desk-top calculator is provided for example with a CNST key, as a constant access key. Each time the CNST key is operated, the different types of constants stored in the desk-top calculator are accessed successively and displayed, as shown in the following Table 1. That is to say that the desired constant used to be accessed by operating the CNST key an appropriate number of times.

TABLE 1

| Operation order | Operation key | Displayed constant | Display contents |
| --- | --- | --- | --- |
| 1 | CNST | c:light velocity | $c = 2.99792458^{08}$ |
| 2 | CNST | G:universal gravitation constant | $G = 6.67259^{-11}$ |
| . | . | . | . |
| . | . | . | . |
| . | . | . | . |
| n | CNST | R:gas constant | $R = 8.31451$ |

Also, some of the conventional desk-top calculators, for example as shown in FIG. 4, are arranged such that, they are provided with a shift key 13, and use the numeric keys 11 both as keys for entering numeric values and as keys for accessing constants. Thus the desired constant is accessed by operating the shift key 13 and a numeric key 11 in combination.

In this type of desk-top calculator, for example the gas constant R used to be accessed by operating the shift key 13 and the key 12 of the numeric value "5", successively.

However, in the conventional desk-top calculator provided with a CNST key described above, in order to access a constant, the CNST key always needs to be operated a determined number of times corresponding to each constant.

Also, in the desk-top calculator provided with the shift key 13, two keys, i.e. the shift key 13 and a numeric key 11, need to be operated each time a constant is being accessed.

Accordingly, a conventional desk-top calculator used to present the problem that its operation tended to be complicated. Especially when accessing constants frequently, the operation efficiency of a conventional desk-top calculator was extremely low.

SUMMARY OF THE INVENTION

The object of the present invention is to provide a desk-top calculator arranged such that after accessing one of the constants by operating the constant access key, when another key is operated, the constant accessed previously may be accessed again thereafter by operating the constant access key only once, thereby to simplify the operation and to improve sharply the operation efficiency.

In order to achieve the above object, the desk-top calculator in accordance with the present invention has the following characteristics:

the desk-top calculator comprises a constant access key, constant storage means and access sequence control means;

the constant storage means is arranged such that different types of constants are anteriorly stored therein and the constants are accessed through the operation of the constant access key; and the access sequence control means is arranged such that, as well as accessing successively the different types of constants stored in the constant storage means each time the constant key is operated consecutively, after one of the constants is accessed through the operation of the constant access key, when another key is operated and said constant key operated again thereafter, the access sequence means accesses the constant previously accessed in the first place.

The desk-top calculator mentioned above may be arranged such that, when the constant access key is operated consecutively, the constants are accessed in their storage order.

The desk-top calculator mentioned above may be also arranged such that, when the constant access key is operated consecutively, the constants are accessed in the order of frequency in access.

According to the arrangement mentioned above, after one of the constants has been accessed through the operation of the constant access key, when another key is operated and the constant access key operated again thereafter, according to the control of the access sequence control means, the constant accessed previously is accessed first.

In other words, a constant which has been accessed once, can be generally regarded as having a high possibility of being accessed again consecutively. In this case as the constant access key needs to be operated only once, the operation of the desk-top calculator is sharply simplified.

BRIEF DESCRIPTION OF THE DRAWINGS

FIG. 1 is a flow chart illustrating the operation in the CPU.

FIG. 2 is a block diagram illustrating the composition of the control unit.

FIG. 3 is a front view showing the composition of a scientific electronic calculator.

DETAILED DESCRIPTION OF THE EMBODIMENTS

Figure 1:
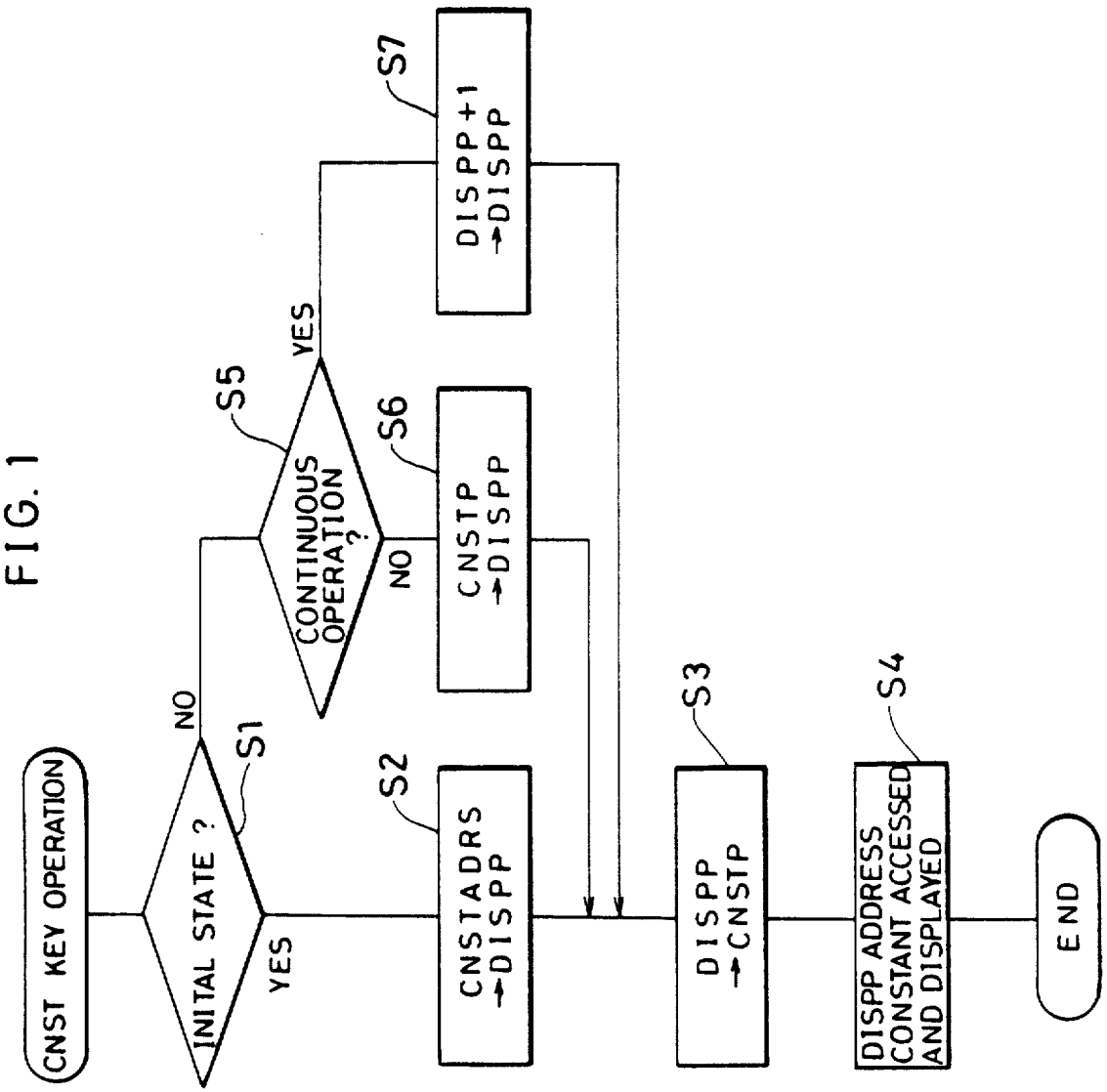
FIG. 1 to FIG. 3 show an embodiment of the present invention.
Figure 2:
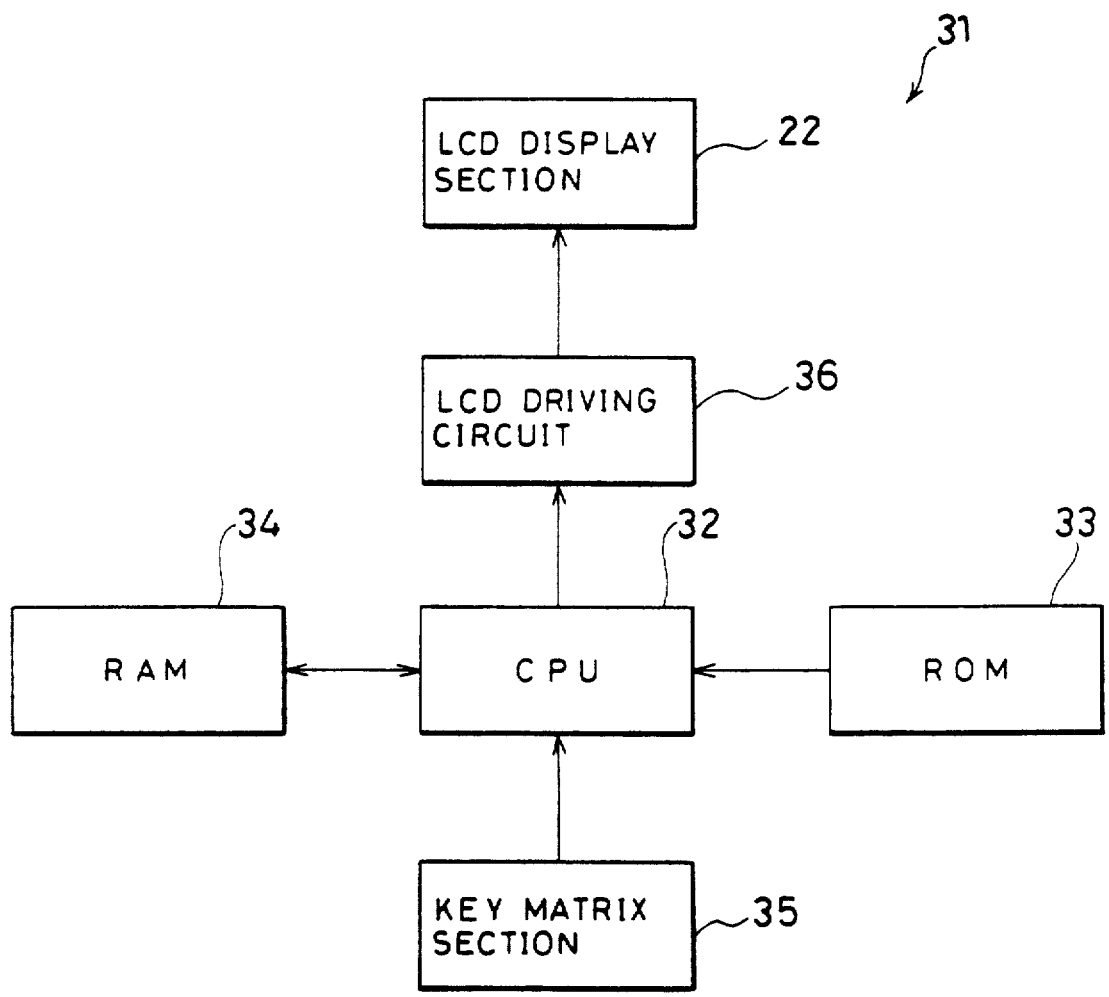
Figure 3:
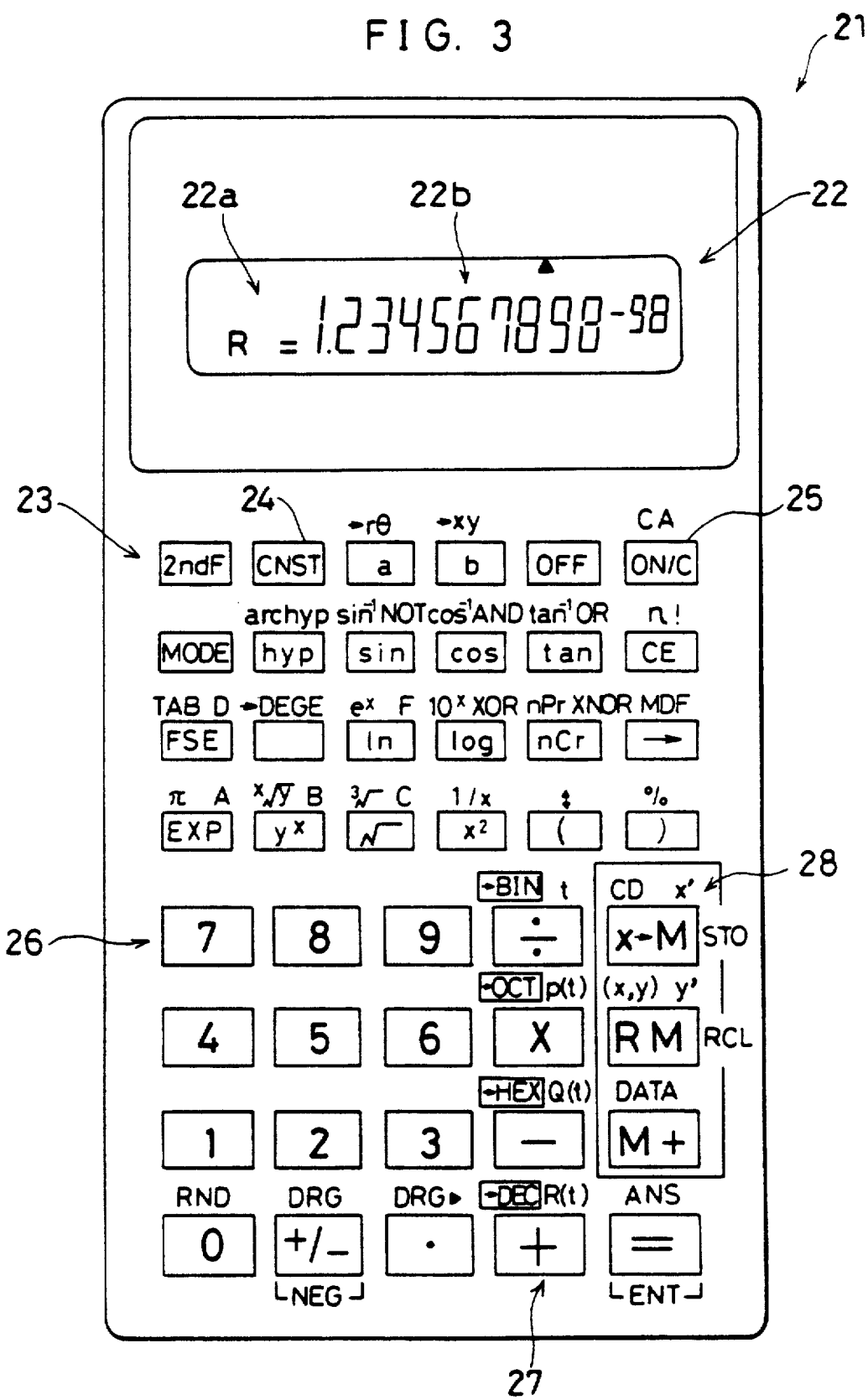
Figure 4:
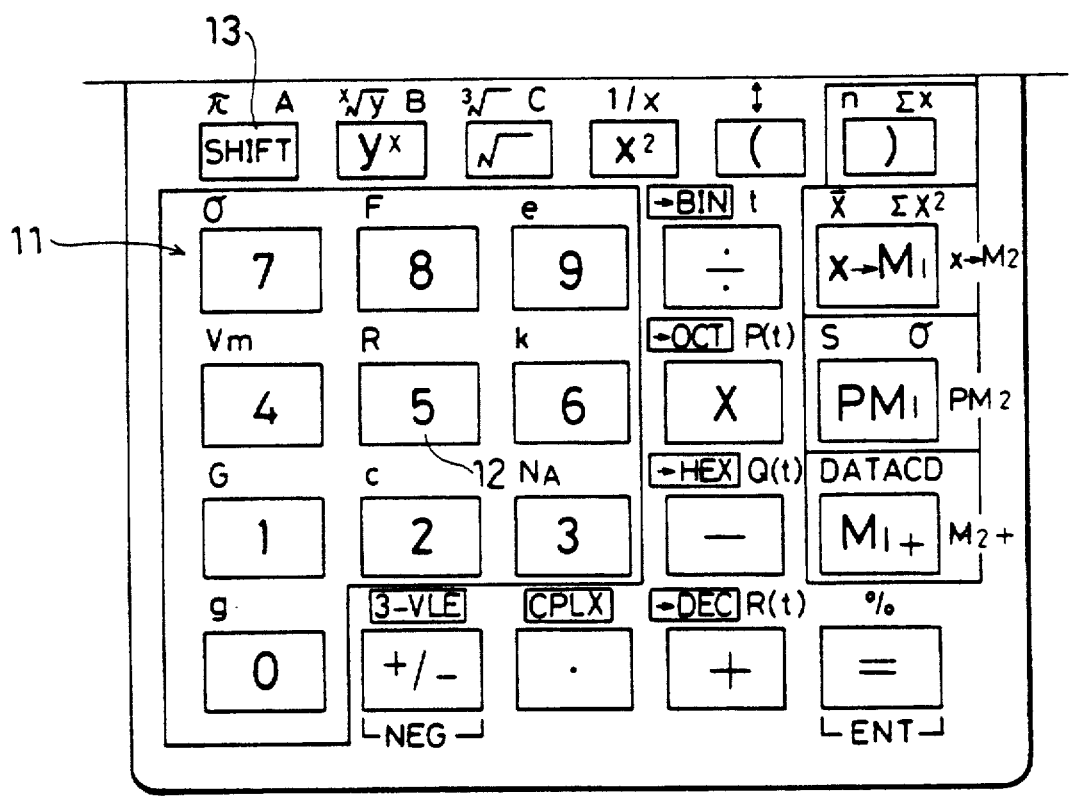
FIG. 4 is a partial enlarged front view showing the composition of a conventional desk-top calculator.

The following description will discuss as an embodiment of the present invention, the example of the scientific electronic calculator for scientific calculations with reference to FIGS. 1 to 3.

As shown in FIG. 3, the scientific electronic calculator 21 is provided with a LCD display section 22 which displays numeric values, characters and the like. This LCD display section 22 is composed of the character display section 22a, which displays characters according to the dot matrix, and of the numeric value display section 22b, which displays essentially numeric values according to the 7 segments display.

Below the LCD display section 22 there is installed the function keys group 23 used for calculating the values of the functions $y^x$, sin, cos and the like. This function keys group 23 includes the CNST key 24, which is the constant access key for accessing the constants stored anteriorly in a ROM 33 described later, the ON/C key 25 to clear the display of the LCD display section 22, and the like.

Below the function keys group 23 there are installed, the numeric value keys group 26 to enter numeric values, the operation keys group 27 to effectuate the arithmetic calculations and the numeric value memory keys group 28 for the use of the numeric value memory.

Inside of the scientific electronic calculator 21 there is provided a control unit 31, as access sequence control means, which is composed like the example shown in the FIG. 2.

This control unit 31 is composed of a CPU 32, which performs the control of the whole scientific electronic calculator 21, the ROM 33 in which the program to be executed by the CPU 32 is stored, a RAM 34 used for instance, as work area comprising an access pointer DISPP, a storage pointer CNSTP and the like, during the program execution of the CPU 32, and as numeric value memory, the key matrix section 35 which detects which key of the function keys group 23 and the like has been operated, and the LCD driving circuit 36 which drives the LCD display section 22.

The above CPU 32 accesses successively the different types of constants stored in the ROM 33 each time the CNST key 24 is operated consecutively. The CPU 32 also functions so that, after one of the constants has been accessed through the operation of the CNST key 24, when another key is operated and the CNST key 24 operated again thereafter, the constant accessed previously is accessed first.

The ROM 33 functions also, like for example shown in the following Table 2, as constant storage means, in which different types of constants, the light velocity, the universal gravitation constant and the like, are stored anteriorly on and after the address shown by CNSTADRS.

On the other hand, the RAM 34 is connected with a battery backup unit so that, even when the scientific electronic calculator is in the OFF state or when the calculation mode has been changed, the values stored therein keep on being preserved.

TABLE 2

| Stored address | Stored constant | Storage contents |
|---|---|---|
| CNSTADRS | c:light velocity | $c = 2.99792458^{08}$ |
| CNSTADRS + 1 | G:universal gravitation constant | $G = 6.67259^{-11}$ |
| . | . | . |
| . | . | . |
| . | . | . |
| CNSTADRS + m | R:gas constant | $R = 8.31451$ |
| CNSTADRS + m + 1 | $R_H$:quantum Hall resistance | $R_H = 2.58128056^{04}$ |
| . | . | |
| . | . | |
| . | . | |

The following is a description with reference to the flow chart shown in FIG. 1, of the program execution in the CPU 32 when the CNST key 24 is operated in the above arrangement.

First, when the CNST 24 key is operated, it is determined whether the scientific electronic calculator 21 is in the initial state, that is, in a state where the CNST key 24 is operated for the first time, or not (S1).

When it is determined in S1 that the scientific electronic calculator 21 is in the initial state, the program moves on to S2. The CNSTADRS, the first address of the region in which the constants are stored in the ROM 33, is written in the access pointer DISPP which accesses the constants, and the program moves on to S3.

In S3, the value written in the access pointer DISPP is written in the storage pointer CNSTP, in order to store which of the constants is accessed.

Then in the ROM 33 the constant stored in the address of the value written in the access pointer DISPP is accessed and displayed in the LCD display section 22 (S4).

On the other hand, when it is determined in the above S1 that the scientific electronic calculator is not in the initial state, the program moves on to S5. In S5 it is determined whether the CNST key 24 is operated consecutively that is whether the key operated just before is also the CNST key 24, or not.

When it is determined in S5 that the CNST key 24 is being operated consecutively, the program moves on to S7. In other words, as shown in the following Table 3, when the CNST key 24 is operated consecutively, each time the CNST key 24 is operated, an increment is added to the value of the access pointer DISPP, in order to access successively the different types of constants stored in the ROM 33, and the program moves on to S3.

Then, as described above, in S3 the value of the access pointer DISPP is written in the storage pointer CNSTP, in order to store which of the constants is newly accessed.

And in the ROM 33 the constant stored in the address of the value written in the access pointer DISPP is accessed and displayed in the LCD display section 22 (S4).

TABLE 3

| Operation order | Operation key | Displayed constant | Display contents |
|---|---|---|---|
| 1 | CNST | c:light velocity | $c = 2.99792458^{08}$ |
| 2 | CNST | G:universal gravitation constant | $G = 6.67259^{-11}$ |
| . | . | . | . |
| . | . | . | . |
| . | . | . | . |
| m + 1 | CNST | R:gas constant | $R = 8.31451$ |
| m + 2 | ON/C | — | 0. |
| m + 3 | CNST | R:gas constant | $R = 8.31451$ |

In S5, when it is determined, like for example shown in the Table 3 above, that the CNST key 24 has been operated subsequently to the ON/C key 25 and thus that the CNST key is not being operated consecutively the program moves on to S6. In S6, value CNSTADRS+m is written in the access pointer DISPP. The value CNSTADRS+m being the value of the storage pointer CNSTP wherein is written the value of the address in which the constant previously accessed, i.e. gas constant R, is stored. Then the program moves on to S3. In other words, by operating the CNST key 24 only once, the gas constant R accessed previously is accessed in the first place and displayed.

Thus, each time the CNST key 24 is operated consecutively the different types of constants stored in the ROM 33 are accessed successively. And also, after one of the constants has been accessed through the operation of the CNST key 24, when the ON/C key or another key is operated and the CNST key operated again thereafter, the constant accessed previously is accessed first.

Further, in the present embodiment the LCD display section 22 is composed of the character display section 22a and the numeric value display section 22b and in the example described, together with the constant value, a character showing what value it is, is displayed. But it is not intended to limit the invention to the precise forms disclosed.

Also, in the example described when the CNST key 24 is operated consecutively, the different types of constants are accessed in the order of the storage in the ROM 33. But this not exhaustive and for example the desk-top calculator may be arranged such that the constants are accessed according to their frequency in access.

The desk-top calculator according to the present invention has, as described above, the following characteristics:

the desk-top calculator comprises a constant access key, constant storage means and access sequence control means;

the constant storage means is arranged such that different types of constants are stored therein and the constants are accessed through the operation of the constant access key; and the access sequence means is arranged such that, as well as accessing the different types of constants stored in the constant storage means each time the constant access key is operated consecutively, after one of the constants is accessed through the operation of the constant access key, when another key is operated and the constant key operated again therefter, the access sequence means accesses the constant previously accessed in the first place.

Accordingly, when consecutively accessing again a constant accessed once through the operation of the access key, the constant access key needs to be operated only once. Therefore the operation is simplified and especially when accessing constants frequently, the operation efficiency sharply improved.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A desk top calculator with access sequence control system for various constants comprising:
    first storing means for storing plural types of constants having mutually different values in previously set addresses;
    access sequence control means for accessing the constants stored in said first storing means, said access sequence control means being connected to said first storing means;
    constant access key means for instructing said access sequence control means to access a specified constant among the constants stored in said first storing means, said constant access key means being connected to said access sequence control means;
    input key means for inputting numerical values and instructions to execute an operation using said desk top calculator, said input key means being connected to said access sequence control means; and
    second storing means wherein an address of the specified constant accessed by said access sequence control means in response to an accessing instruction inputted through said constant access key means, is written,
    wherein said access sequence control means
    (a) in the case that accessing instructions are consecutively inputted through said constant access key means, updates the address written in said second storing means upon each of the accessing instructions; and
    (b) in the case that said input key means was operated between a first operation and a second operation of said constant access key means, accesses the constant corresponding to the address that was written in said second storing means upon the accessing instruction inputted through said constant access key means before said input key means was operated.

2. The desk-top calculator as defined in claim 1, wherein said first storing means comprises a ROM which is read only storage means.

3. The desk-top calculator as defined in claim 2 wherein said access sequence control means comprises a control unit composed of:
    a key matrix section for detecting which key has been operated;
    the ROM;
    a CPU for conducting the control over the entirety of said desk-top calculator;
    a RAM for use for instance as work area during the operation of said CPU and as numeric value memory;
    a LCD display section for displaying numeric values, characters and the like; and
    a LCD driving circuit for driving said LCD display section.

4. The desk-top calculator as defined in claim 3 wherein said control unit is arranged such that said constants are accessed from said ROM in the order of said constants storage.

5. The desk-top calculator as defined in claim 3 wherein said control unit is arranged such that, said constants are accessed from said ROM in the order corresponding to said constants frequency in access.

6. The desk-top calculator as defined in claim 3 wherein said LCD display section comprises:
    a character display section for displaying characters and the like; and
    a numeric value display section for displaying essentially numeric values.

7. The desk-top calculator as defined in claim 6 wherein said numeric value display section includes a 7 segments display circuit.

8. The desk-top calculator as defined in claim 6 wherein said character display section includes a liquid crystal display composed of a dot matrix.

9. The desk-top calculator as defined in claim 3 further including a battery backup unit for the sake of the information stored in said RAM.

10. The desk-top calculator as defined in claim 3, wherein said RAM includes:
   an access pointer forming a storage region wherein an address of one said constant to be accessed is stored; and
   a storage pointer forming a storage region wherein an address of one said accessed constant is stored.

11. A desk top calculator as defined in claim 1, further comprising:
   a display section for displaying numerical values and codes; and
   display section driving means for displaying on said display section the constant accessed by said access sequence control means upon the accessing instruction from said constant access key means.

12. A desk top calculator as defined in claim 1, wherein:
   (1) said second storing means includes
      (a) a work area where the address of said first storing means accessed by said access sequence control means upon the accessing instruction inputted through said constant access key means, is written by said access sequence control means; and
      (b) a storage area where the address written in said the work area is stored, and
   (2) said access sequence control means
      (a) in the case that the accessing instructions are consecutively inputted through said constant access key means, updates the address written in said work area upon each of the accessing instructions; and
      (b) when the second operation of said constant access key means is executed, accesses the constant corresponding to the address stored in said storing area.

13. A method of displaying constants in a desk top calculator with access sequence control system for various constants, comprising the steps of:
   inputting an accessing instruction for accessing a specified constant to access sequence control means by operating constant access key means, the specified constant being one of constants stored in first storing means;
   determining by said access sequence control means whether the accessing instruction from said constant access key means is inputted for a first time;
   writing by said access sequence control means in second storing means an address of said first storing means, the address being previously set for an initial operation of said constant access key means;
   determining, in the case that said constant access key means was operated not less than twice, by said access sequence control means whether said constant access key means is operated consecutively;
   updating, in the case that said constant access key means is operated consecutively, by said access sequence control means the address written in said second storing means in accordance with a number of times said constant access key is operated;
   accessing, in the case that input key means for inputting a numerical value or an instruction for an operation using said desk top calculator was operated between a first operation and a second operation of said constant access key means, by said access sequence control means the constant corresponding to the address written in said second storing means upon the accessing instruction inputted through said constant access key means before said input key means was operated, and
   displaying by display section driving means the constant accessed by said access sequence control means.

14. The method of claim 13, wherein said address updating step includes:
   determining by an initial state detecting step whether said constant access key is operated for the first time or not;
   writing a constant initial address in said access pointer when said constant access key is operated for the first time;
   determining whether said constant access key is operated consecutively or not when said constant access key is not operated for the first time;
   adding an increment to said constant address written in said access pointer when said constant access key is operated continuously; and
   writing in said access pointer said information written in said storage pointer when said constant access key is not operated consecutively.

15. A constant display method as defined in claim 13 further comprising the steps of:
   writing in a storage area of said second storing means the address that was written in a work area through said access sequence control means upon the accessing instruction from said constant access key means;
   retaining by second storing means retains the address written in said storage area; and
   writing, in the case that an instruction for an operation using said desk top calculator was inputted through said input key means between a first operation and a second operation of said constant access key means, by said access sequence control means the address stored in said storage area, in said work area.

* * * * *